United States Patent [19]

Demos et al.

[11] 3,866,127

[45] Feb. 11, 1975

[54] SELECTIVE AUDIO SIGNAL FREQUENCY MULTIPLIER

[76] Inventors: Gary A. Demos, 1153 Descanso Dr., La Canada, Calif. 91011; David S. Ruhoff, P.O. Box 4492, Pasadena, Calif. 91106

[22] Filed: Sept. 12, 1973

[21] Appl. No.: 396,373

[52] U.S. Cl. ..................... 328/38, 328/37, 328/151, 328/162

[51] Int. Cl. ............................................ H03k 5/00

[58] Field of Search ............ 328/15, 20, 25, 37, 38, 328/39, 151, 162

[56] References Cited

UNITED STATES PATENTS

| | | | |
|---|---|---|---|
| 3,184,685 | 5/1965 | Funk et al. | 328/37 X |
| 3,657,658 | 4/1972 | Rubo | 328/38 X |
| 3,673,391 | 6/1972 | Lougheed | 328/38 X |

*Primary Examiner*—John S. Heyman
*Attorney, Agent, or Firm*—Clarence A. O'Brien & Harvey B. Jacobson

[57] ABSTRACT

A system for increasing the frequency of a periodic signal while at the same time reproducing the wave-form shape and amplitude of the signal at the higher frequency. The input signal is sampled each cycle period during sequential intervals, the sampled signal voltages being stored in a memory and read out in the same or reversed sequence during a readout period of shorter duration than the input cycle period in order to reconstruct the input signal wave form with the same amplitude but at the higher frequency. The memory is accordingly addressed by a sampling control logic and a readout logic. These address logic devices are driven by clock signals generated either independently of the input signal or as a function of the input signal frequency.

16 Claims, 10 Drawing Figures

SELECTIVE AUDIO SIGNAL FREQUENCY MULTIPLIER

This invention relates to the changing of the frequency of an incoming audio signal while preserving its wave form characteristics and amplitude.

Signal frequency changing devices are well known but are relatively limited as to the opening frequency range of the incoming signal and cannot accurately reconstruct the input signal wave form. It is therefore an important object of the present invention to provide a frequency multiplying system having a relatively wide operating frequency range and capable of accurately reconstructing the signal wave form shape and amplitude.

In accordance with the present invention, an input signal is reconstructed by sampling the signal during each of its wave form periods at a controlled rate in order to establish a plurality of voltage level segments of the input signal wave form that are stored within a memory. The stored voltage segments are read out of the memory in the same or in a reverse sequence during a readout period. Address logic devices control the sampling and readout operations of the memory and are driven by clock signals derived either independently of the input signal or as a function thereof by means of signal frequency changing devices. The input signal is therefore not only sampled and stored in the memory but is also applied to a signal digitizing component from which a digital output is obtained to drive the clock or frequency changing devices from which the clock signals are derived for operating the address logic devices.

These together with other objects and advantages which will become subsequently apparent reside in the details of construction and operation as more fully hereinafter described and claimed, reference being had to the accompanying drawings forming a part hereof, wherein like numerals refer to like parts throughout.

Figures 1, 2:
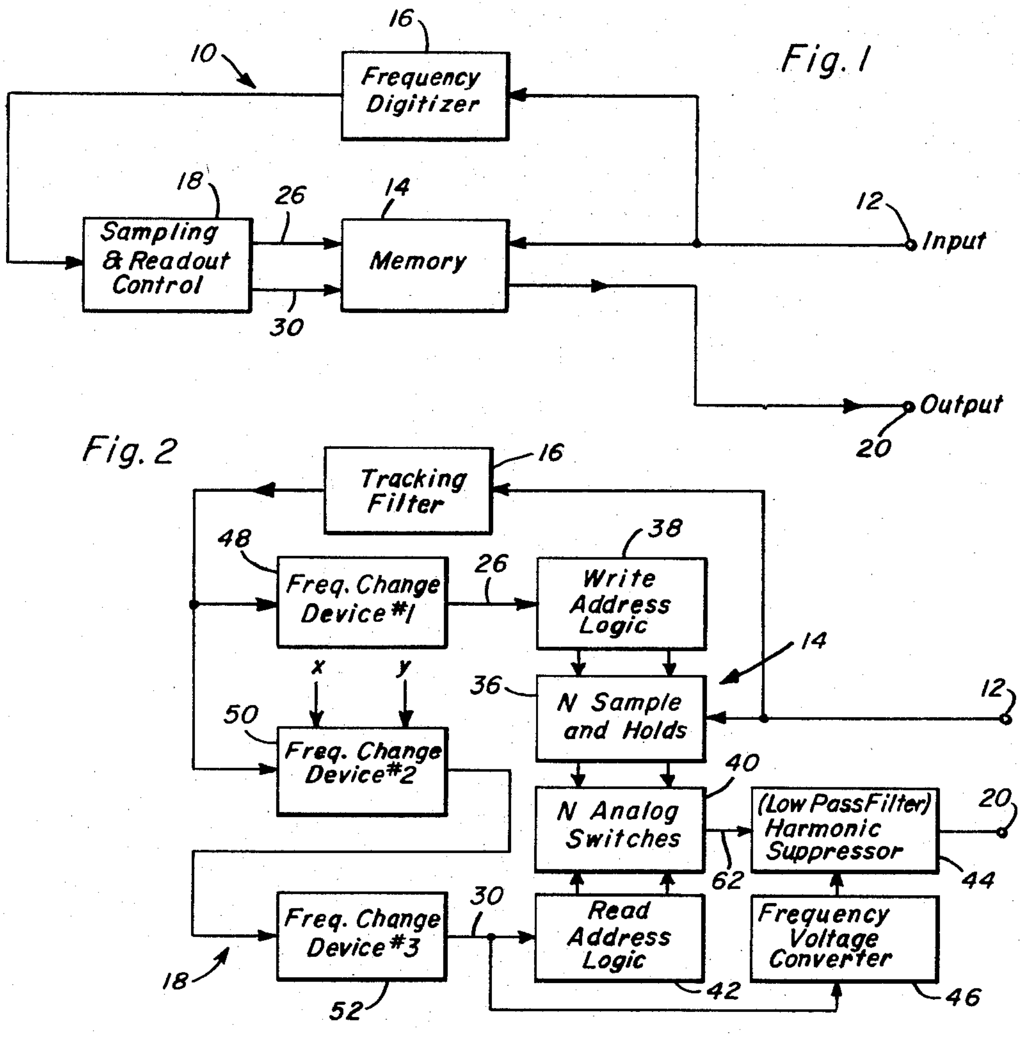
FIG. 1 is a schematic block diagram illustrating the basic system of the present invention.
FIG. 2 is a schematic block diagram illustrating in greater detail, one embodiment of the system depicted in FIG. 1.

Referring now to the drawings in detail, FIG. 1 diagrammatically depicts the basic system of the present invention generally referred to by reference numeral 10. An audio input signal having a clearly defined fundamental input frequency appearing at the input terminal 12 is applied to a memory component 14 and a frequency digitizer 16. The frequency digitizer produces output pulses of constant width at a frequency equal to the input frequency of the input signal. Input pulses are accordingly applied from the digitizer 16 to a sampling and readout control component 18 through which signal sampling and readout operations of the memory component 14 are controlled. The output of the memory component 14 is applied to the output terminal 20 at which the input signal is reproduced at a different frequency but with its waveform shape and amplitude preserved.

Figure 4:
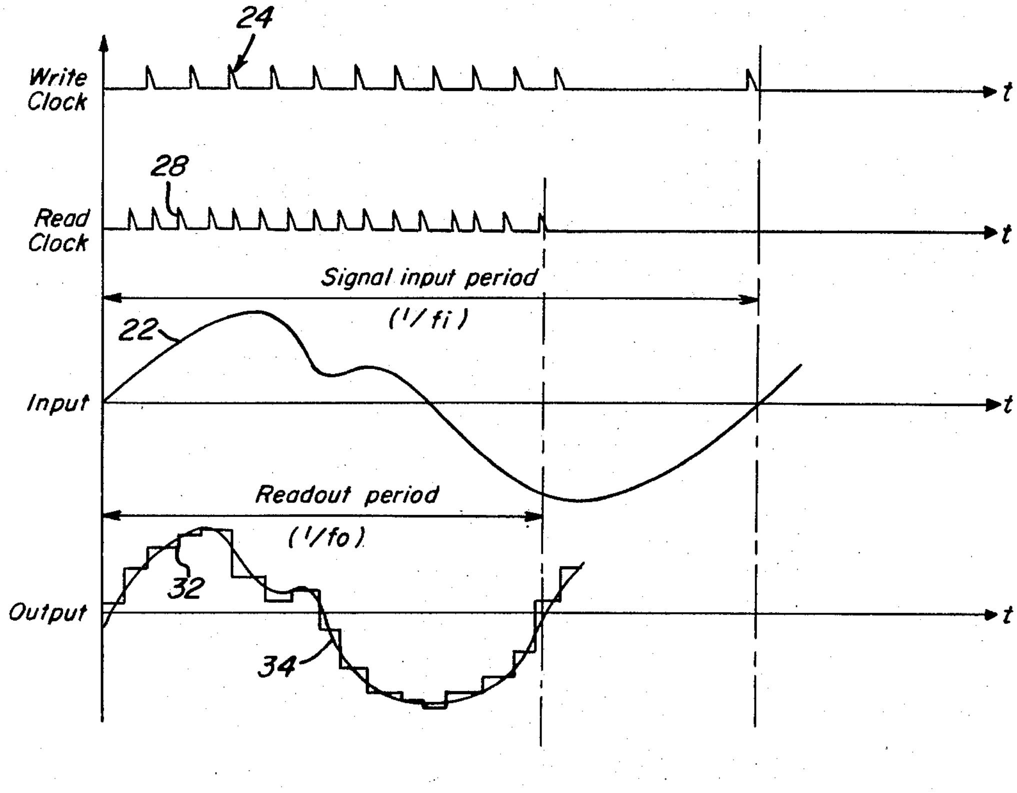
FIG. 4 is a graphical illustration of the signal characteristics associated with the system illustrated in FIGS. 1 through 3.

The memory component 14 is rendered operative to sequentially sample the voltage levels of an input signal wave form 22 as shown in FIG. 4 by way of example. By means of the components 16 and 18, a predetermined number (N) of clock pulses 24 as shown in FIG. 4, are fed by a control line 26 to the memory component 14 as diagrammed in FIG. 1 in order to sequentially sample at different spaced intervals, the voltage of the input signal 22 during each signal input period. Accordingly, sampled voltage segments are stored in the memory component and subsequently read out during a readout period of shorter duration under control of read clock pulses 28 as shown in FIG. 4. The output of the memory component will accordingly appear as a series of voltage steps or segments 30 having a signal envelope 32 which conforms to the wave-form shape of the input signal 22. However, the output frequency ($f_o$) of the output signal 32 will be some programmed function of the input frequency ($f_i$) which is selected through the sampling and readout control component 18.

FIG. 2 diagrammatically illustrates one embodiment of the invention utilizing an analog type of memory component which includes a sample and hold component 34 to which the input signal is applied from the input terminal 12. Component 34 will accordingly sample N wave-form voltage segments of the input signal during the signal input period under control of a write address logic 36 to which clock pulses are fed from the sampling and readout control component 18 through control line 26. The wave-form voltage segments stored in component 36 are transferred out of the memory component through a series of N analog switches 40 under control of a read address logic 42 to which the read clock pulses 28 are fed through the control line 30 as aforementioned. The output of the memory component is fed to the output terminal 20 through a low pass filter 44 in the embodiment shown in FIG. 2, for harmonic suppression purposes, the low pass filter being voltage controlled. Accordingly, the read clock pulses in control line 30 are also fed to a frequency to voltage converter 46 from which the control voltage for the low pass filter 44 is derived.

The frequency digitizer component 16 is a tracking filter and it feeds pulses of constant width at the input signal frequency to a pair of constant amplitude, square wave frequency changing devices 48 and 50 of any suitable type. The frequency changing device 48 multiplies the input frequency to produce the write clock pulses as a multiple of the input frequency fed by control line 26 to the write address logic 38. The frequency changing device 50 on the other hand, is externally programmable and connected in series with another frequency changing device 52 in order to produce the read clock pulses 28 in control line 30 at a frequency which is equal to the product of (N), the number of wave-form voltage segments sampled during each signal input period, and a function of two program factors (X) and (Y). Accordingly, the relationship between the input and output frequencies at terminals 12 and 20 will be as follows:

$$f_o = f_i\,(X/Y).$$

The foregoing change in frequency produced by the system of the present invention may thus be set as a pre-programmed function of the input signal frequency through the frequency changing device 50 while preserving the wave-form shape and amplitude of the input signal.

Figure 3:
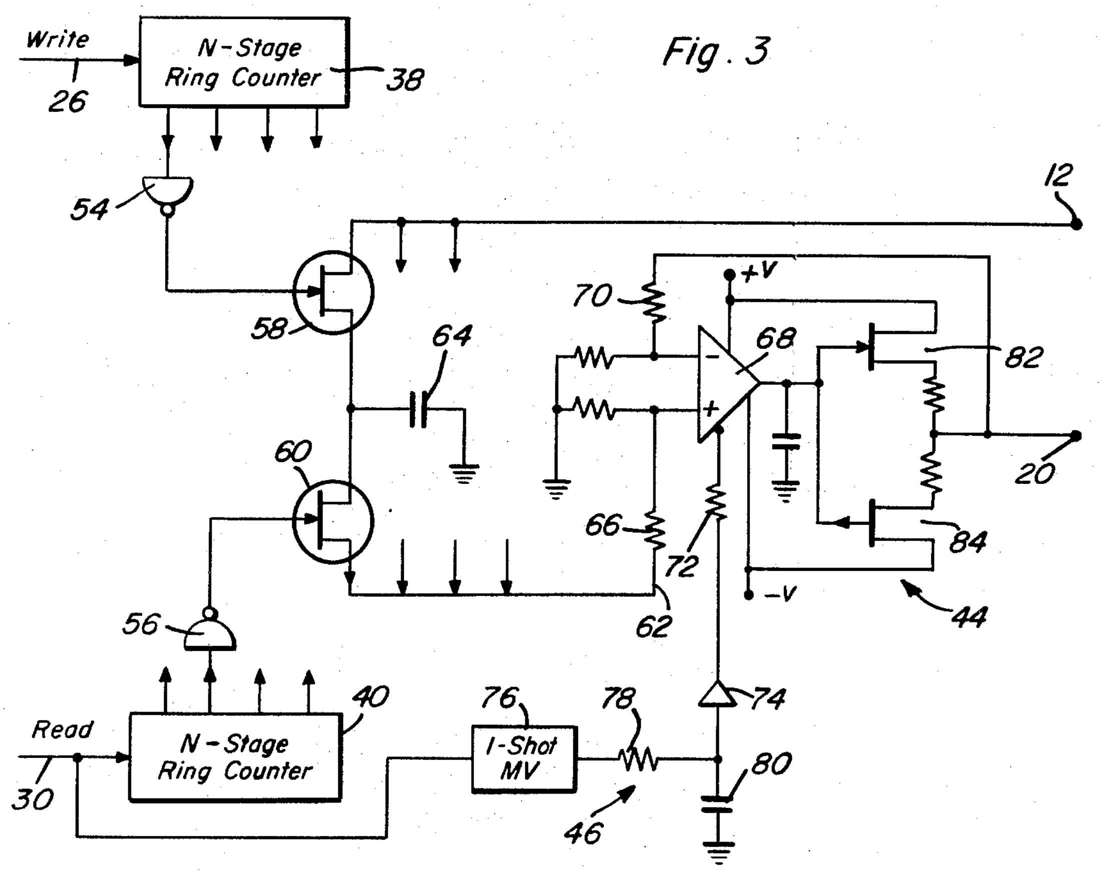
FIG. 3 is a more detailed circuit diagram corresponding to the system depicted in FIG. 2.

Referring now to FIG. 3, a more specific circuit arrangement is shown, corresponding to the system illustrated in FIG. 2. The address logic devices 38 and 42 may be in the form of N-stage ring counters, the output of which may be respectively transmitted through signal level translators 54 and 56 to FET type electronic analog switches 58 and 60 at their control terminals. The electronic switches 58 and 60 respectively associated with each of the stages of the counters 38 and 40, are interconnected in series between the input terminal 12 and an output signal line 62 connected to the low pass filter 44. A storage capacitor 64 is interconnected between the series connected switches 58 and 60 so as to store the wave-form voltage sampled upon opening of the switch 58 and discharge the stored voltage upon opening of the readout switch 60. The clock pulses supplied to the counters 38 and 40 will accordingly control the sequential opening of the voltage sampling switches 58 to sample and store the wave-form voltage segments and sequential opening of the switches 60 at a different rate to read out the sampled voltages in the capacitors 64. The low pass filter 44 to which the readout voltages are applied through resistor 66, include a transconductance amplifier 68 receiving the output signal at its positive input terminal. Feedback is supplied to its negative input terminal through resistor 70 from the the output terminal 20 while a control voltage is supplied to the amplifier through resistor 72 from a buffer amplifier 74 associated with the frequency to voltage converter 46 which also includes a one shot multivibrator 76 having an input connected to the control line 30 and an ouput connected to an RC filter network including resistor 78 and capacitor 80. Accordingly, the frequency of the clock pulses in line 30 are converted into a voltage output which is proportional to the clock pulse frequency in order to control operation of low pass filter 44 to filter out the steps present in the frequency changed wave form signal 34 as graphically depicted in FIG. 4. The output of the amplifier 68 in the low pass filter 44, is coupled to the output terminal 20 through a pair of FET transistors 82 and 84. By virtue of the particular circuit configuration of the low pass filter 44, its signal output will be characterized by a cut-off slope at a "corner" frequency which is a function of the control voltage applied thereto, derived from the read clock frequency, in order to obtain the desired tracking of the filter. This accounts for the filtering out of the voltage steps in the output signal.

Figure 5:
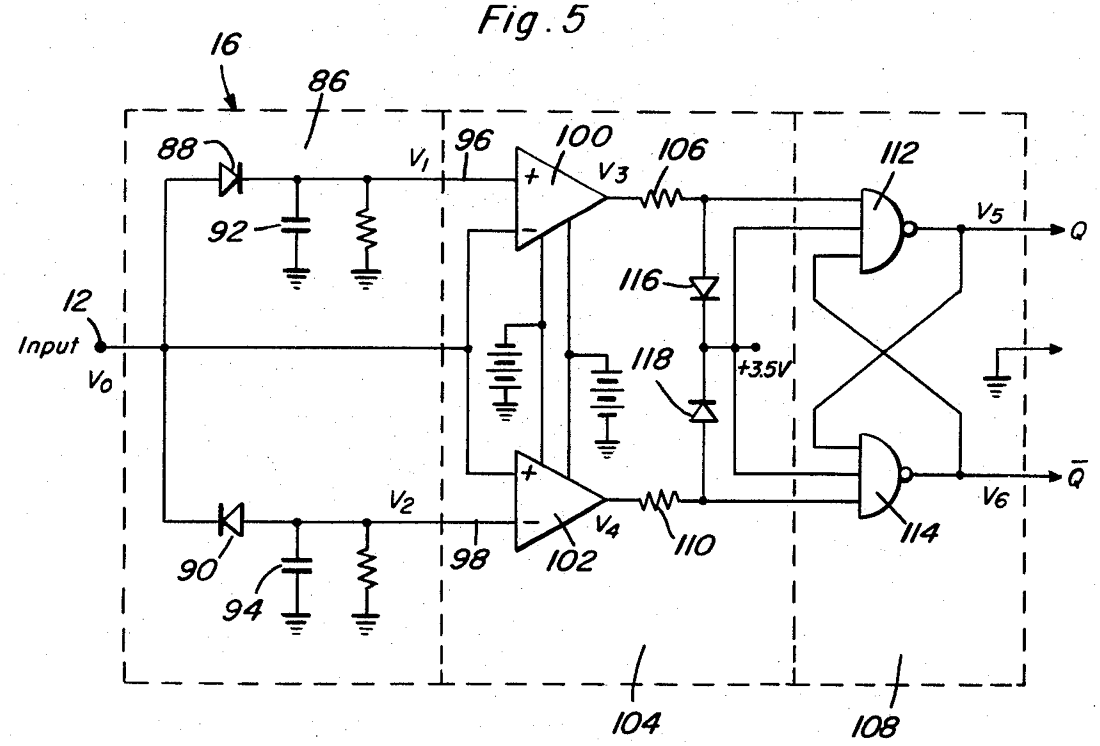
FIG. 5 is a circuit diagram of one of the components associated with the system shown in FIGS. 1 through 3.
Figure 6:
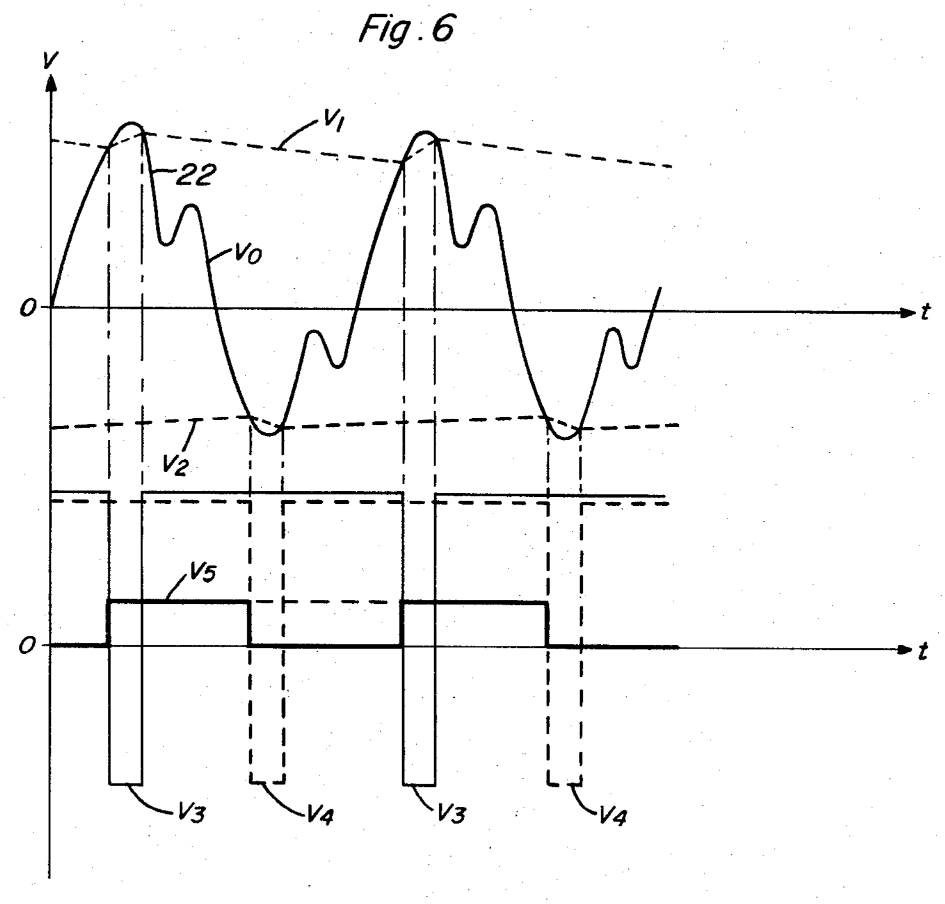
FIG. 6 is a graphical illustration of the signal characteristics associated with the component shown in FIG. 5.

The tracking filter component 16 hereinbefore referred to, is designed to transform the input signal which has a periodic wave form characteristic, with an amplitude varying, harmonic content, into a constant amplitude, jitterfree square wave at the fundamental frequency of the input signal. One form of tracking filter, as shown in FIG. 5, includes peak detector section 86 having a pair of reversely positioned diodes 88 and 90 to which the input signal voltage is applied in order to respectively charge capacitors 92 and 94 to positive and negative peak values respectively. The peak voltage outputs of the peak detector section 86 are applied through lines 96 and 98 to the non-inverting and inverting input terminals of a pair of operational amplifiers 100 and 102 in a comparator section 104. Accordingly, when the voltage at the non-inverting input of amplifier 100 is more positive than the voltage at the inverting input of amplifier 102, a low output is fed through resistor 106 to a R-S flip-flop section 108. Conversely, when the non-inverting input to amplifier 100 is more negative than the inverting input to amplifier 102, the output of amplifier 100 is low. Thus, the amplifier 100 produces a low output whenever diode 88 is charging capacitor 92 while a low output is produced from the amplifier 102 whenever diode 90 is charging capacitor 94, the output of amplifier 102 being fed through resistor 110 to the flip-flop section 108. The R-S flip-flop configuration is formed by the interconnection of NAND gates 112 and 114 so that whenever the output of amplifier 100 is low, the flip-flop is set and whenever the output of amplifier 102 is low, the flip-flop is reset. Diodes 116 and 118 together with resistors 106 and 110, function to clamp the outputs of the comparator amplifiers 100 and 102 to suitable levels for operation of the NAND gates. The operation of the peak detector section 86 is independent of the amplitude and harmonic content of the input signals so long as the amplitude is greater than the forward voltage drops of diodes 88 and 90, provided the strength of the harmonics is less than roughly half the strength of the fundamental frequency. FIG. 6 shows the input voltage signal 22 applied to the peak detector section 86 resulting in the application of positive and negative peak voltages V1 and V2 to the comparator section 104 resulting in outputs V3 and V4 applied to the flip-flop section 108. The output voltages from the comparator section are accordingly converted into a voltage signal V5 of constant pulse width and of a frequency equal to the fundamental frequency of the input signal. Generation of this type of pulse signal is necessary in order to operate the sampling and readout control component 18 hereinbefore described.

Figure 7:
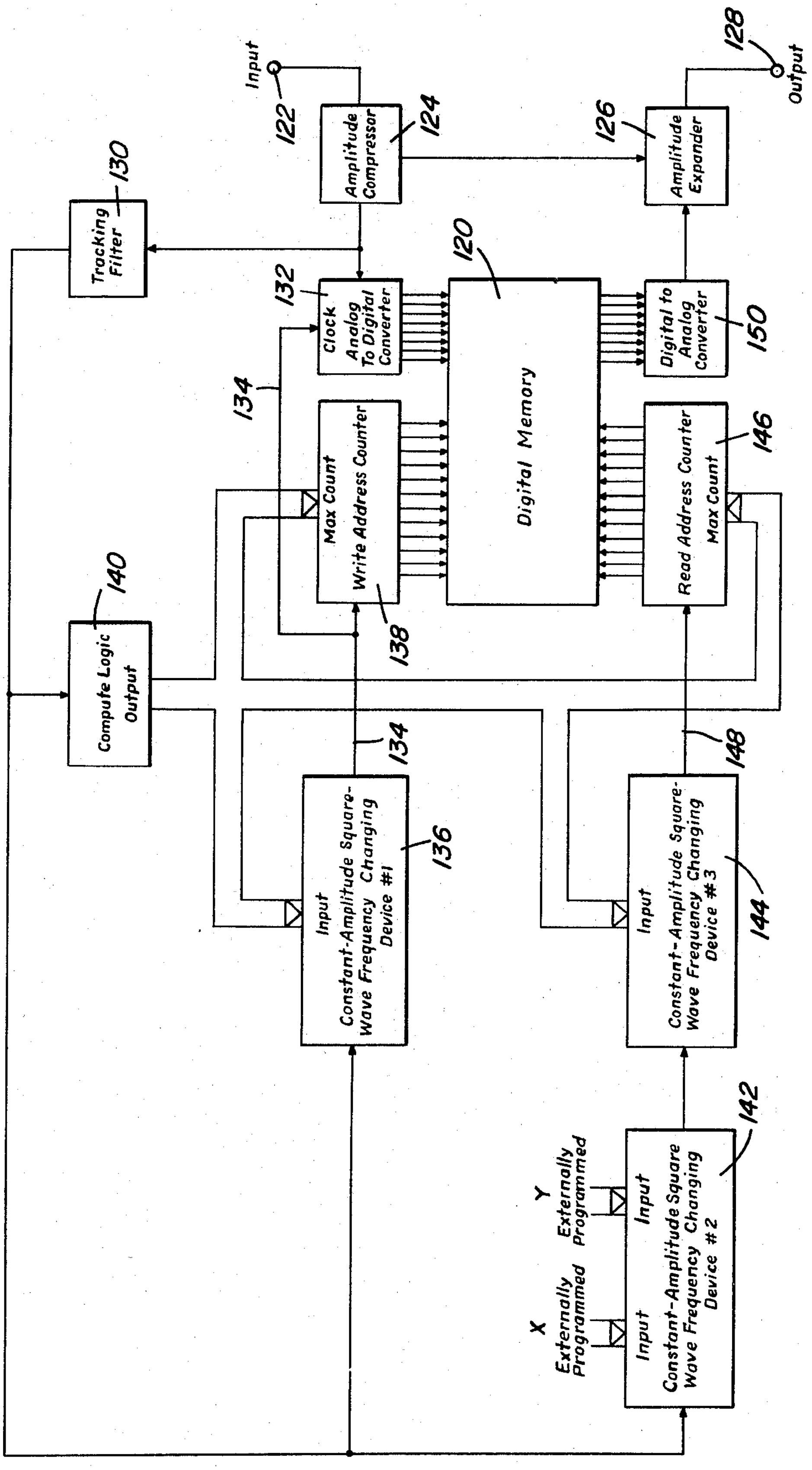
FIG. 7 is a schematic block diagram depicting another embodiment of the system in accordance with the present invention.

An analog memory component was hereinbefore described in connection with FIGS. 2 and 3 which would be suitable provided that the number of samples (N) obtained of the wave form voltage during the input signal period, is not too high. It may, however, be desirable to obtain a larger number of samples, proportional to the period of the input signal wave form, so as to bring it into the ultrasonic range thereby eliminating the need for filtering out the sampling frequency from the output wave form. Further, the accuracy of the wave form shape stored may be maintained over the entire audio spectrum. In order to take advantage of a higher signal sampling rate, a much larger memory component is necessary which precludes the use of an analog memory. Accordingly, the use of a digital memory component may be desirable particularly in view of the availability of low cost semi-conductor, integrated circuit types of digital memories, at the present time. FIG. 7 illustrates in block diagram form, an embodiment of the invention in which the input signal sampling rate is significantly increased by use of such a digitial memory component 120. The input signal at terminal 122 in this embodiment of the invention, is processed through an amplitude compressor 124 since the digital memory component 120 does not have the wide dynamic range characteristic of an analog memory component. Accordingly, an amplitude expander component 126 is also provided for reversing the effect of the amplitude compressor on the output signal wave form supplied to the output terminal 128. The amplitude clamped input signal is accordingly fed to the tracking filter 130 in which its fundamental is extracted as a square wave as hereinbefore described. A constant level signal is also supplied from the amplitude compressor 124 to an analog to digital converter 132 in order to insure maximum wave form accuracy regardless of input amplitude. The analog to digital converter 132 samples the amplitude compressed, input wave form at a rate determined by its clock input 134 from a constant amplitude, square wave frequency changing device 136. A corresponding digital number is accordingly outputed from the converter 132 to the memory 120 within which it is stored at the address selected by the write address counter 138 to which the clock input 134 is also applied. The counter 138 is incremented each sample period and when a maximum count is reached, it is reset to zero.

The square wave signal output of the tracking filter 130 is also applied to a compute logic component 140 as well as to the frequency changing device 136 aforementioned and the externally programmed frequency changing device 142. The frequency changing device 142 is connected in series with a third frequency changing device 144 as hereinbefore described in connection with the system of FIGS. 2 and 3 in order to supply read clock pulses to the read address counter 146 through control line 148. The counter 146 is also reset to zero when it reaches a maximum count after being advanced a predetermined number of times per readout period as a function determined by the programming of the frequency changing device 142. Thus, only those words in the memory 120 corresponding to the current wave shape are read into the digital to analog converter 150 producing an analog signal as hereinbefore described in connection with the system of FIGS. 2 and 3. The analog signal is then passed through the amplitude expander 126, which is voltage controlled in order to restore the original signal level. The sampling rate characterizing operation of the system illustrated in FIG. 7, is determined by the compute logic 140, the output of which is applied to the frequency changing devices 136 and 144, and to the address counters 138 and 146. The compute logic senses the period of the input signal and outputs a signal representing the sampling rate (Z) that satisfies the following relationship:

$$f_{cl}/(f_i)\ L_{max} \leq Z \leq f_{cl}/(f_i)\ L_{min}$$

where $f_{cl}$ is clock frequency, $f_i$ is input frequency, $L_{min}$ is minimum latch number made less than 50 and $L_{max}$ is the maximum latch number governed by the size of the counters.

Figure 8:
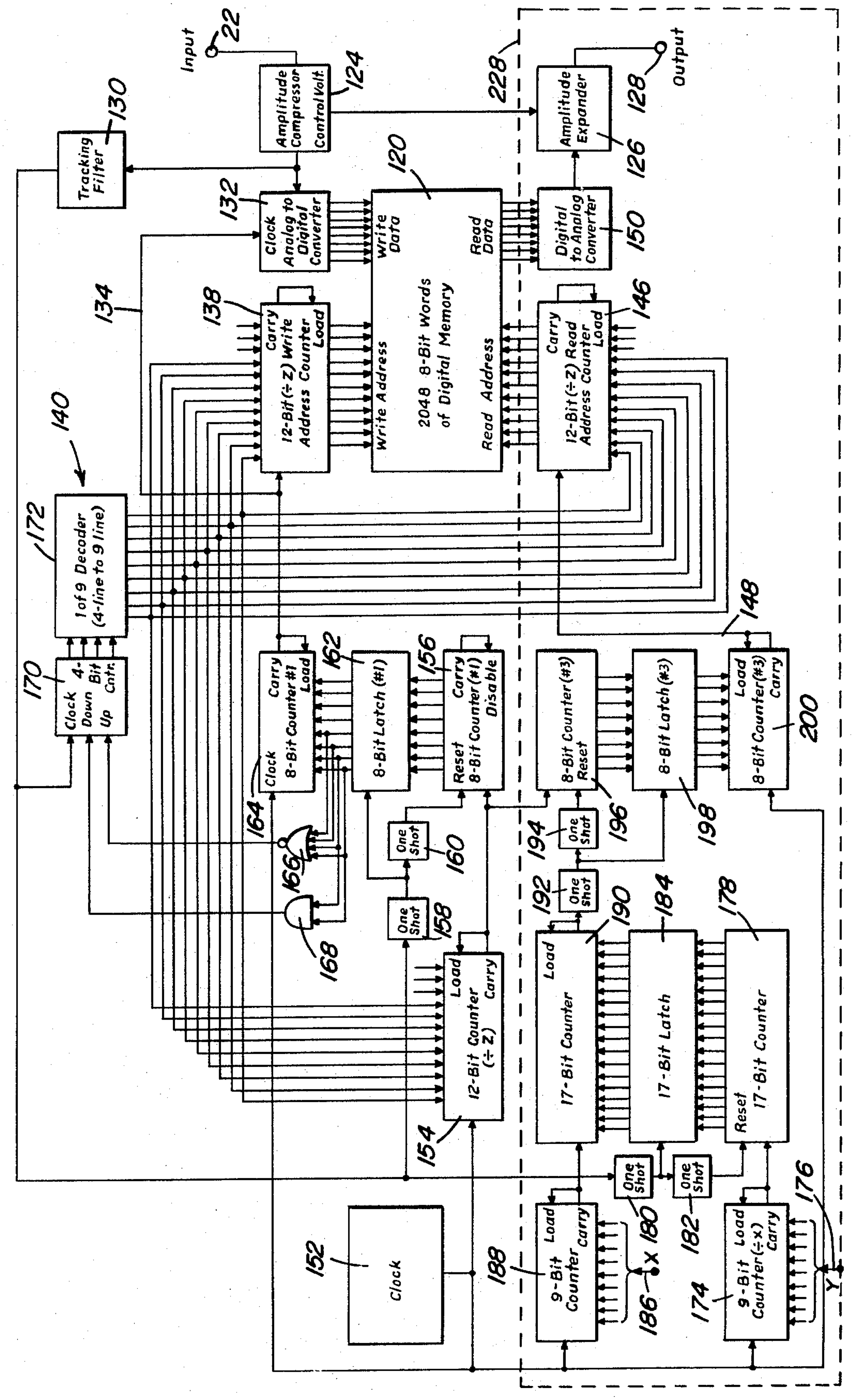
FIG. 8 is a more detailed block diagram of the system shown in FIG. 7.

FIG. 8 depicts the same system as shown in FIG. 7 with greater detail. The address counter 138 is of the 12-bit type which counts until a carry condition is detected at which time the sampling rate signal is loaded into the counter from the compute logic 140. The counter then counts up to its expanded count and the cycle is repeated. Since the analog to digital converter 132 and the write address counter 138 are clocked at a rate equal to the product of the sampling rate and the input frequency, the wave shape is stored in the last expanded number of memory words and of course updated each input period.

A high frequency clock 152 drives a divide by Z counter 154 outputting a pulse and loading counts up to carry and then repeating the cycle to yield a frequency divided clock pulse which is counted by a 8-bit counter 156. The counter 156 is reset to zero every period of the input signal by the action of one shot multivibrators 158 and 160 connected in series between the output of the tracking filter 130 and the reset terminal of counter 156. Just before reset, however, the current count length representing the period of the input signal, is loaded into an 8-bit latch 162 by the one shot multivibrator 158. This results in the loading of the 8-bit output counter 164 producing an output pulse after completing a count at a frequency which is the required rate for clocking the converter 132 and the write address counter 138. The complement of the number loaded into the latch 162, is sensed by the gates 166 and 168. If this number is less than $L_{min}$, then the AND gate 168 enables the countdown input of the program counter 170 of the compute logic. If the latch number is greater than $L_{max}$, then the NOR gate 166 enables the count-up input of the program counter. Either operation of the program counter is clocked by the input period and its count decoded by the line decoder 172 of the compute logic. The decoder 172 maintains all of the outputs thereof high except for the output addressed by the number represented by the input lines thereto resulting in the computation of the sampling rate in accordance with the relationship aforementioned.

To summarize, the input period is measured as a number in the latch 162 and if this measured number is outside of the range defined by $L_{min}$ and $L_{max}$, then the sampling rate (Z) is changed at the next input transition by incrementing or decrementing the program counter 170. Since the last number is inversely proportional to the sampling rate (Z), the latach number will always be within specified constraints after a reasonable number of input periods. The carry output of the input counter 156 drives the disable input in order to stop the counter at a maximum count. Otherwise, a small number not corresponding to the input period might be loaded into the latch 162 activating the gate 168 instead of gate 166. The foregoing circuitry thus develops the write clock control.

In order to develop the read clock control for the address counter 146, the high frequency clock 152 drives a 9-bit, divide by (X) counter 174 which counts up to carry and outputs a pulse loading the preprogrammed number at the (X) input 176. The counter 174 then counts up to carry and repeats the cycle to yield a signal which is counted up by the input counter 178. This counter is reset every input period by one shot multivibrators 180 and 182. Just before reset, the current count lengths of counter 178 representing the time of the input period, is loaded into latch 184 by one shot multivibrator 180. The same operation is performed with respect to the programmed (Y) input 186 through the 9-bit counter 188 driven by the clock 152, the latch 190, the one-shot multivibrators 192, 194 and 8-bit output counter 196. Also, loading of the latch 198 is effected. Finally, the high frequency clock 152 drives the output counter 200 which counts up to carry an output pulse and load a number in the latch terminal and then counts up to carry to repeat the cycle, yielding a signal which is used to increment the read address counter 146 at the sampling rate per output period. Thus the output frequency is $f_o = f_i\ (X/Y)$. The 12-bit address counter 146 counts until a carry condition is detected at which time the data input from the decoder 172 is loaded into the counter and the counter counts up to the end of its cycle which is then repeated. Only those words in the memory corresponding to the current wave shape are read into the digital to analog converter 150 producing an analog signal as aforementioned passed to the voltage controlled amplitude expander 126.

The amplitude compressor and expander 124 and 126 may be eliminated by utilizing a larger memory and multi-sized, digital to analog converter and analog to digital converter. Further, by selective control of the read address counter, the wave shape may be read out in either direction and by including suitable multiplexing circuitry, for the read address and read data lines of the memory, multiple notes at different frequencies can be read simultaneously.

Figure 9:
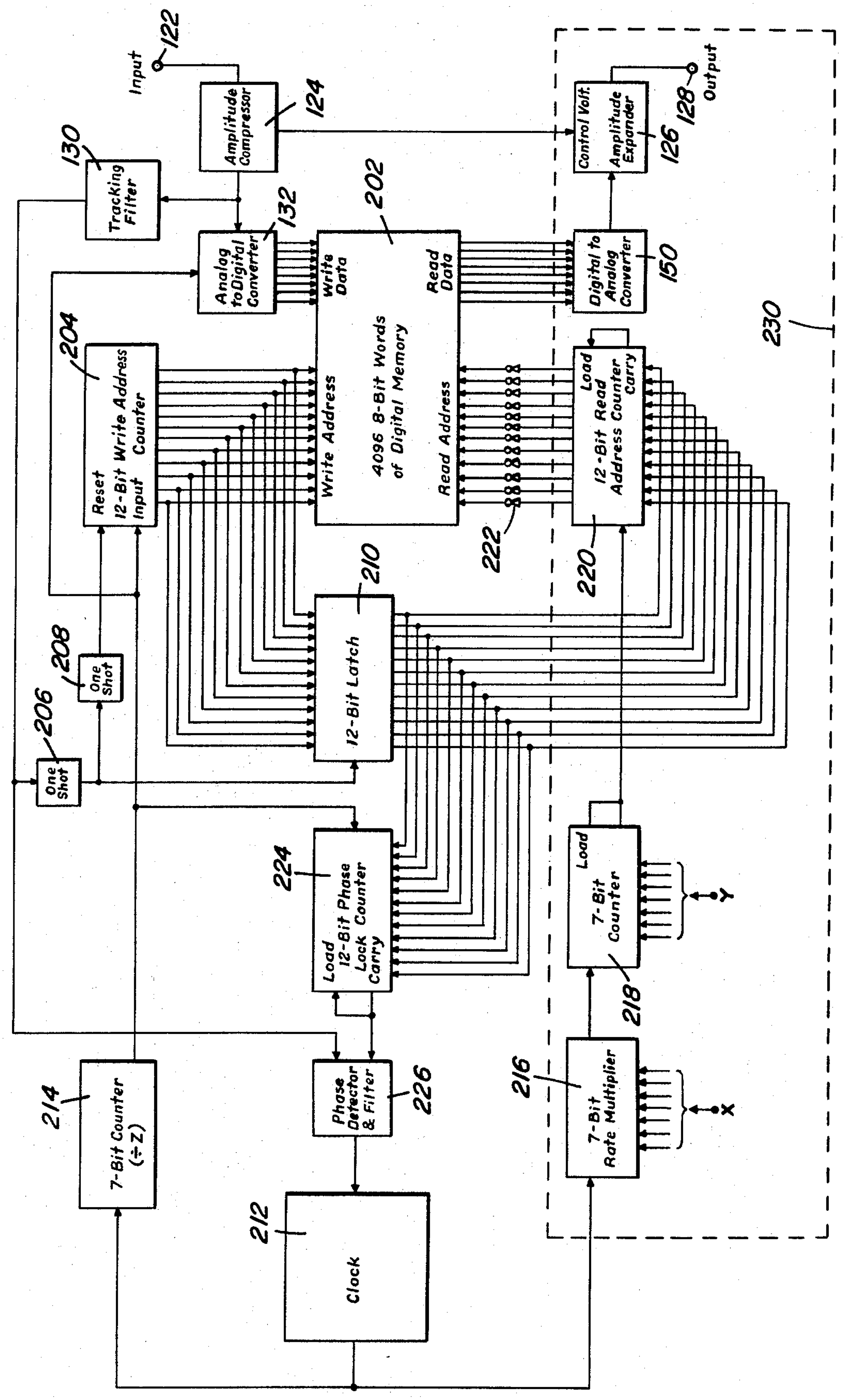
FIG. 9 is a block diagram illustrating yet another embodiment of the invention.

FIG. 9 illustrates yet another embodiment of the invention utilizing a digital memory component 202 to which sampled input data is applied through an analog to digital converter as hereinbefore described in connection with FIGS. 7 and 8 after which output data is read out through a digital to analog converter 150. The analog to digital converter 132 samples the input signal at a rate determined by a clock input to supply a digital member output to the memory 202. The output of the converter 132 is stored in the memory at the address selected by a 12-bit counter 204 which is incremented at a relatively high but constant sample rate. Thus, the number of samples per period is directly proportional to the period of the input signal. The counter 204 is reset by a signal derived from the digital output of the tracking filter 130 through the one shot multivibrators 206 and 208. Just before the counter 204 is reset, the output count of the counter 204 is loaded into a 12-bit latch 210 under control of the one shot multivibrator 206. A high frequency clock 212 drives a 7-bit, frequency divide counter 214 to supply the address counter 204 with an input at a frequency equal to the clock frequency divided by the sampling rate as well as to feed this input to the analog to digital converter 132. The high frequency clock 212 also drives a 7-bit rate multiplier 216 which is externally programmed by an (X) factor. The output of the multiplier 216 is fed to a 7-bit frequency dividing counter 218 which is externally programmed by a divide by (Y) factor. The counter 218 counts up to carry, outputs a pulse and then loads the number at the (Y) input, then counts up to carry and repeats the cycle yielding a signal at a frequency (f) in accordance with the following formula:

$$f = f_{cl}/2^z \cdot X/Y\ ,$$

wherein $f_{cl}$ is the clock frequency, Z is the sampling rate, (X) is one of the externally programmed factors, (Y) is the other externally programmed factor. The output of the counter 218 is fed to the read address counter 220 for operation at the required rate. The counter 220 counts up to carry, loads a number in the 12-bit latch 210 and again counts up to carry repeating the cycle. The output of the counter 220 through inverters 222, addresses the memory 202 in order to output a word to the digital to analog converter 150 thereby reconstructing the input wave form at a rate in accordance with the following expression: $N + f_o = f_{cl}/Z + Z/Y$. The analog signal output from the converter 150 is then applied to the amplitude expander driven from the amplitude compressor 124 in order to yield a signal with the same amplitude as the input. In order to achieve frequency stability, a 12-bit phase lock counter 224 is provided clocked by the output of the counter 214 in order to output a pulse and load a number into the latch 210. The output pulse of the counter 224 is applied to a phase detector 226 which develops a dc correction voltage applied to the high frequency, voltage controlled clock 212. This feedback loop assures that the clock frequency is an integral multiple of the input frequency.

It will be apparent from the foregoing description of FIG. 9, that the system depicted therein is operative to continuously sample the input signal at an expanded rate as compared to the sampling rate associated with the systems employing an analog memory. Continuous sampling of the input signal as compared to sampling at a computed rate represents the basic distinction between the system illustrated in FIG. 9 and the system described with respect to FIGS. 7 and 8. Further, by duplicating the circuitry enclosed within dotted lines 228 and 230 in FIGS. 8 and 9 respectively, adding suitable multiplexing circuitry for the read data lines of the memory, and replacing the inverters 222 of FIG. 9, with suitable multiplexing, multiple notes at different frequencies can be read out simultaneously.

Figure 10:
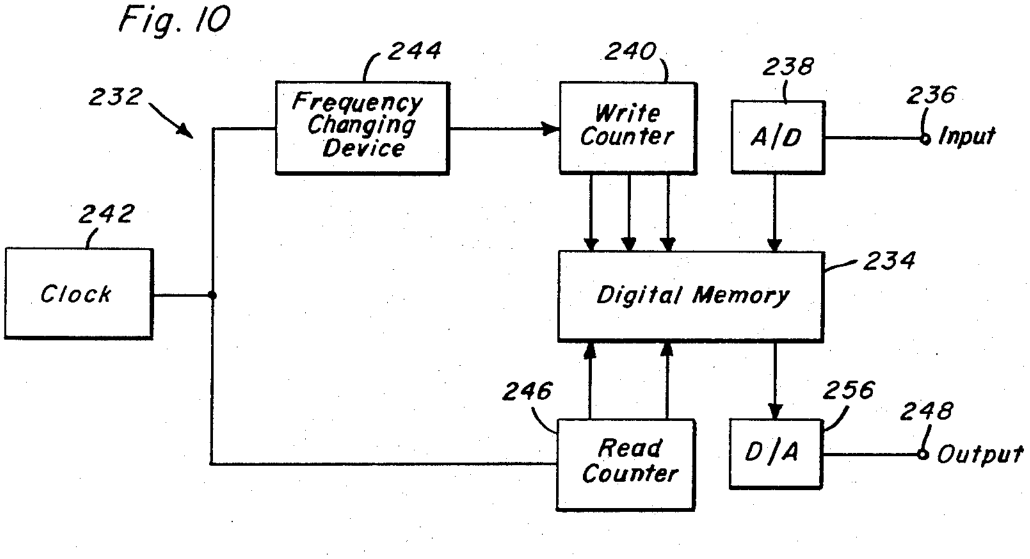
FIG. 10 is a simplified block diagram illustrating still another embodiment of the invention.

FIG. 10 illustrates a frequency multiplier system generally denoted by reference numeral 232 utilizing a digital memory 234 characterized by a constant sampling rate. Operation of the system 232 is similar to the digital memory systems hereinbefore described except that the read and write frequencies bear no relation to the incoming audio signal at the input terminal 236. The input signal is accordingly sampled by the analog to digital converter 238 and applied to the digital memory 234 under control of an address from the write counter 240 to which an input is applied at a constant sample rate frequency determined by the output of the clock 242 and the frequency changing device 244 that is preset. The output of the clock 242 is applied directly to the read counter 246 for controlling read out of the stored data to the output terminal 248 through the digital to analog converter 250. The system 232 has the disadvantage that it will neither allow multiplication of spectral frequency greater than the digital memory's maximum read frequency divided by the sampling rate frequency nor allow division of the spectral frequency by more than the sampling rate frequency divided by 40 kilocycles. The advantage of the circuit on the other hand is that the input wave form need not have a recognizable fundamental.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is new is as follows:

1. Apparatus for multiplying the frequency of a continuous analog input signal while reproducing the wave form shape thereof without distortion, comprising memory means for storing wave form amplitude of the input signal during each signal period, signal sampling control means connected to the memory means and responsive to the input signal for rendering the memory means operative to sequentially sample and store a predetermined number of segments of the wave form amplitude during each of the signal periods, readout control means for sequentially transferring said predetermined number of wave form amplitude segments from the memory means, during a readout period of a duration that is a programmed function of the signal period, frequency control means connected to the readout control means for selecting an output frequency that is a multiple of said input frequency and output means connected to the memory means for transmitting an envelope of said transferred wave form segments at said output frequency.

2. The combination of claim 1 wherein said predetermined number of wave form segments is a constant multiple of the frequency of the input signal.

3. The combination of claim 2 including means for digitizing the input signal into pulses of constant width at the input frequency of the input signal, said pulses being fed to the signal sampling control means.

4. The combination of claim 3 wherein said sampling and readout control means include frequency changing devices for respectively converting said input pulses into write and read clock pulses and address logic devices connected to the frequency changing devices for controlling sampling and readout operations of the memory means in response to said clock pulses.

5. The combination of claim 4 wherein the frequency control means includes an externally programmable frequency changing device connected to the first mentioned frequency changing device for converting the input pulses with the read clock pulses.

6. The combination of claim 1 including means for digitizing the input signal into pulses of constant width at the input frequency of the input signal, said pulses being fed to the signal sampling control means.

7. The combination of claim 6 wherein said sampling and readout control means include frequency changing devices for respectively converting said input pulses into write and read clock pulses and address logic devices connected to the frequency changing devices for controlling sampling and readout operations of the memory means in response to said clock pulses.

8. The combination of claim 7 wherein the readout control means further includes an externally programmable frequency changing device in series with the first mentioned frequency changing device.

9. The combination of claim 1 wherein said memory means includes a plurality of analog sampling switches equal in number to said wave form segments a plurality of readout switches respectively connected in series with the sampling switches, and storage capacitors connected between said sampling and readout switches.

10. The combination of claim 9 wherein said output means includes a voltage controlled, low pass filter connected to the readout switches of the memory means and frequency to voltage converter means connecting the readout control means to the filter for harmonic suppression of the wave form envelope transferred from the memory means.

11. The combination of claim 1 wherein said input signal has an input frequency within the audio frequency range, and means in the sampling rate control means for sampling the input signal at a rate higher than the frequencies in the audio range.

12. The combination of claim 11 wherein said memory means is of the digital type.

13. The combination of claim 1 including means for controlling the sampling of the input signal at a continuous rate that is a product of the frequency of the input signal and a constant.

14. The combination of claim 1 including means for controlling the sampling of the input signal at a rate continuously up-dated in accordance with changes in frequency of the input signal.

15. Apparatus for multiplying the frequency of an input signal while preserving the wave form shape thereof, comprising memory means for storing wave form amplitude of the input signal during each signal period, means for digitizing the input signal into input pulses of constant width at the input frequency of the input signal, a first frequency changing device for converting said input pulses fed thereto into write pulses, a write address logic device transmitting said write pulses to the memory means for rendering the same operative to sequentially sample and store segments of the wave form amplitude during each of said signal periods equal in number to a constant multiple of the frequency of the input signal, a second frequency changing device for converting said input pulses into read pulses, a read address logic device transmitting said read pulses to the memory means for sequentially transferring therefrom the wave form amplitude segments stored therein, an externally programmable frequency changing device connected to the second frequency changing device for rendering the memory means operative to transfer said wave form amplitude segments during a readout period of a duration that is a programmed function of the signal period, an output means connected to the memory means for transmitting an envelope of said transferred wave form segments at an output frequency that is the reciprocal of said readout period, said memory means including a plurality of analog sampling switches equal in number to said wave form segments, a plurality of readout switches respectively connected in series with the sampling switches, and storage capacitors connected between said sampling and readout switches.

16. The combination of claim 15 wherein said output means includes a voltage controlled, low pass filter connected to the readout switches of the memory means and frequency to voltage converter means connecting the readout control means to the filter for harmonic suppression of the wave form envelope transferred from the memory means.

* * * * *

Notice of Adverse Decision in Interference

In Interference No. 99,286, involving Patent No. 3,866,127, G. A. Demos and D. S. Ruhoff, SELECTIVE AUDIO SIGNAL FREQUENCY MULTIPLIER, final judgment adverse to the patentees was rendered Mar. 2, 1977, as to claims 1–9, and 11–15.

[*Official Gazette July 5, 1977.*]